United States Patent [19]

Clegg et al.

[11] Patent Number: 5,477,459
[45] Date of Patent: Dec. 19, 1995

[54] REAL TIME THREE-DIMENSIONAL MACHINE LOCATING SYSTEM

[76] Inventors: Philip M. Clegg, 521 E. 4020 North, Provo, Utah 84604; Paul C. Harris, 8717 191 st Pl. SW., Edmunds, Wash. 98026; Curtis C. Genstler, 14019 Cascadian Way, Everrett, Wash. 98208

[21] Appl. No.: 394,394

[22] Filed: Feb. 24, 1995

Related U.S. Application Data

[63] Continuation of Ser. No. 847,914, Mar. 6, 1992, abandoned.

[51] Int. Cl.⁶ .......................... G06F 165/00; G01C 1/04
[52] U.S. Cl. ................. 364/460; 364/424.07; 356/152.1
[58] Field of Search ..................... 364/460, 561, 364/559, 424.01, 424.07; 356/1, 152.1, 400; 37/DIG. 1; 348/118, 119, 120

[56] References Cited

U.S. PATENT DOCUMENTS

| | | | |
|---|---|---|---|
| 4,700,301 | 10/1987 | Dyke | 364/424.02 |
| 4,774,403 | 9/1988 | Arts | 250/205 |
| 4,807,131 | 2/1989 | Clegg | 364/424.01 |
| 5,076,690 | 12/1991 | DeVos et al. | 356/152 |
| 5,100,229 | 3/1992 | Lundberg et al. | 356/1 |
| 5,196,900 | 3/1993 | Pettersen | 356/141 |

*Primary Examiner*—Michael Zanelli

[57] ABSTRACT

A method and system for locating the point $P_0$ which defines the location of a machine, e.g. an earth moving machine, a surveying or locating machine, etc., in relation to a tract or area of interest by measuring the angles defined by two different sets of reference points selected from at least three reference points that are in known relation to the tract or area.

18 Claims, 4 Drawing Sheets

REAL TIME THREE-DIMENSIONAL MACHINE LOCATING SYSTEM

REFERENCE TO RELATED APPLICATION

This is a continuation of application No. 07/847,914, filed Mar. 6, 1992, now abandoned, to which priority is claimed.

BACKGROUND OF THE INVENTION

In the field of surveying and distance measuring equipment, there is a need to determine the position of objects (markers, etc. ) relative to fixed points. There are several methods for doing this. In general, two approaches are used. One method involves the measurement of linear distances; another, the measurement of angles and distances. Usually a construction site is surveyed and the topography is plotted before work begins. Fixed flags tell the equipment operators to either cut or fill a particular location. An iterative process of survey and grade is used to work the site into the final topography prior to actual construction. This iterative process is slow and laborious and therefore expensive. Since there is a great deal of human work involved, it is also error prone.

The prior art describes many efforts to use modem electromagnetic technology to control the movement and action of earth moving devices. The most pertinent of these efforts known to the inventor is described in U.S. Pat. No. 5,076,690, to deVos et al., that discloses a sophisticated and ingenious system for locating an earthworking machine or handheld survey device and defining the direction of movement thereof. Triangulation between three bar-coded reflective plates positioned at known coordinates relative to each other around the periphery of a two-dimensional coordinate frame is accomplished by rotating a calibrated laser source to impinge upon and be reflected by the reflectors. A computer solves simultaneous equations based upon angular measurements to triangulate the position of the machine and, using a series of such triangulations, to define the direction of travel. While the deVos, et al., system appears to be quite suitable for working a small to moderate tract of relatively flat land, it has certain important limitations that are overcome by the present invention. First, the deVos, et al, system works in only one plane. Secondly, being reflective and requiting accurate readings of reflected bar codes, the system is limited to use on small tracts, i.e. , where the maximum distance from the machine or survey device to any reflector is not more than about 100 meters. There remains a serious need for systems that are suitable for use on hilly or uneven terrain and upon much larger tracts, such as are commonly worked in certain parts of the country and in large housing projects. It is to these needs that the present invention is primarily directed, though it may be used on tracts of any size or terrain.

Other prior art efforts are described in the following patents and publications.

U.S. Pat. No. 4,700,301, to Dyke, on Oct. 13, 1987, discloses a method of automatically steering agricultural type vehicles on a preprogrammed course by continuously measuring angles between reference points and using a microprocessor to calculate vehicle position and direction of motion.

U.S. Pat. No. 4,677,555, to Goyet on Jun. 30, 1987, describes a method and equipment for automatic guidance of earthmoving machines and especially machines for laying drainage elements. The machine consists in preliminary recording, in digital form and on a moving magnetic recording medium, of all the planimetric and altimetric data relating to the operations to be performed with reference to datum points and to reference plane. There are then placed on the ground of the drainage site fixed beacons for marking the location of the selected datum points as well as a rotating laser beam emitter for defining the desired reference plane. The crawler machine to be guided is equipped with a microprocessor control-module for reading the indications recorded on the magnetic recording medium and controlling two guidance devices, one device being employed for planimetric guidance of the crawler machine and the other device being employed for altimetric guidance of the drain-laying or digging tool of the machine. These two control devices produce action respectively on the steering control of the machine and on the system for controlling the height-setting of the tool with reference to the fixed locating beacons and to the plane defined by the rotating laser beam.

U.S. Pat. No. 4,537,259, to Funabashi on Aug. 27, 1985, describes a blade control device that comprises a change-over switch for providing light receiving position deviation signal sent out from a light receiving device into a light receiving device control system as a command value, and a device for measuring the change in the height of the light receiving device, whereby a topographic survey is conducted based on the height change of the light receiving device.

U.S. Pat. No. 4,413,684, to Duncklee, on Nov. 11, 1983, discloses a laser-controlled ground leveling device with overfill sensor and wheel rise limiting device for detecting when the box blade is full and overflowing is imminent and sensing the level of the box blade relative to the ground. The improvement overrides the functions of the conventional laser beam controls.

U.S. Pat. No. 4,402,368, to Moberly on Sep. 6, 1983, discloses an earth scraper and ground support therefor capable of self adjustment in accordance with a preestablished signal such as a laser beam, capable of grading cross sloping surfaces, capable of minimizing blade deflection caused by carrier wheels hitting a flaw in grade, and adaptable for highway towing along a single lane of a highway.

U.S. Pat. No. 4,299,290, to Nunes, on Nov. 10, 1981, describes a grading machine and blade moving structure that includes a grading blade supported by caster wheels and a laser sensor or receiver is carried by the grading machine for raising and lowering the grading blade as the receiver falls and rises in traveling across a field.

U.S. Pat. No. 4,273,196, to Etsusaki, on Jun. 16, 1981, discloses a beam receiver secured to an upper portion of a blade of an earth working equipment can rotate in a horizontal plane and move in a vertical direction and, accordingly, can catch a laser beam from a beam projector regardless of a direction of the equipment. When the beam has been deviated out of the beam receiver, the direction of the deviation is detected so that the beam can be received by the beam receiver again. The height of the beam receiver relative to the blade can be adjusted and the level of the blade can thereby be controlled very accurately.

U.S. Pat. No. 4,173,258, to Boulais, et al., on Nov. 6, 1979, disclose a laser beam level control with automatic override function to temporarily block blade-down signals and raise the blade when lowering it or leaving it at its previous height would increase the force required to drive the machine across the ground above a preselected value which does not exceed the tractional force capability of the machine's drive wheels or exceed the machine's available horsepower.

U.S. Pat. No. 4,751,782, to Ammann, on Jun. 21. 1988, discloses a beam levelling instruments that has a pipe length which is vertically and centrally mounted in the cover of a casing. The ends of this pipe length are pivotable, so that it can always be held in the vertical position. For this purpose two spirit levels are arranged at right angles to one another on a plate fixed to the lower end of the pipe length. The fluid in these levels is electrically conducting and the levels have electric contact points for operating a respective electric motor. The electric motors are provided with eccentric shafts which come into contact with the circumferential surface of the pipe length. If the pipe length diverges from the vertical, then the current from batteries ensures that it is brought back into the vertical position by means of the eccentric shafts. A laser light source is located in the lower part of the pipe length and a further pipe length is inserted in the upper end of the pipe length and can be rotated by a third electric motor. The further pipe length carries a head with a window. The laser beam enters the head vertically, is diverted there into the horizontal and passes out of the window as a horizontal laser beam.

U.S. Pat. No. 4,244,123, to Gelesko, on Jan. 13, 1981, describes a guidance device for drain tile laying machine having an improved guidance device for use with an earthworking machine more especially a drain tile laying machine, comprising a earthworking element mounted about a pivot connection. This guidance device comprises a signal emitter and two signal receivers mounted on the earthworking element of the machine. The two signal receivers are mounted on the dement in a longitudinal spaced apart relation, so as to distinguish between a depth change or an attitude change in the element. The guidance device also comprises operating means including an electronic control circuit and an hydraulic operating circuit for adjusting the attitude or depth of the element depending on the indication given by the signal receivers.

U.S. Pat. No. 4,836,669, to Teach, on Jun. 6, 1989, discloses apparatus and method project light in two orthogonal planes to provide reference planes of light for use in laying out a construction site or the like. The apparatus comprises a laser light source for providing a source beam of light, and a light diverting arrangement. The light diverting arrangement diverts a first portion of the source beam of light to project a first thin reference fan beam of light substantially in a first reference plane, and diverts a second portion of the source beam of light to project a second thin reference fan beam of light substantially in a second reference plane. The second reference plane is substantially perpendicular to the first reference plane.

U.S. Pat. No. 4,807,131, to Clegg, on Feb. 21, 1989, describes a fully automated earthgrading machine and system such as an earth grading system for grading a tract of land using a power driven earth grading machine, a laser beam generator remote from the earth grading machine for projecting a laser beam in a predetermined pattern relative to the earth to be graded. A laser detector is carried on the grading machine for receiving the laser beam and a computer is provided for calculating distances and the actual location of the grading tool relative to the continuum computed by the reference data signal and controlling the grading in accordance with a predetermined computer program.

U.S. Pat. No. 4,774,403, to Arts, on Sep. 27, 1988, discloses a position measuring device using a triangulation scheme for position sensing. A laser diode projects a spot upon a target surface. The image of the spot is focused on a charge coupled device linear image sensor. The image of the sensor is indicative of the distance from the device to the target surface.

U.S. Pat. No. 5,032,023, to Schneiter, on Jul. 16, 1991, discloses an apparatus for a variable depth triangulation ranging system, the ranging system including means for emitting a fight beam, means for focusing an emitted light beam on an object, and lens means for imaging reflected light onto an input end of said apparatus. The apparatus includes an optical fiber bundle, the bundle including an input end and an output end, the bundle input end being disposed so as to intercept transmissions from said lens means, means for scanning, in a time-based manner, the bundle output end, the scanning means being configured to generate a time-based signal indicative of a light signals present at the bundle output end, and means for calculating system geometry and range from the time-based signal.

Tanabe, Toru, *Experimental Validation of GPS-INS-STAR Hybrid Navigation System for Space Autonomy*, International Astronautical Congress, 39th, Bangalore, India, Oct. 8–15, 1988. 12 p. (Abst.) describes the gps-ins-star hybrid navigation system concept combines these three sensors: a ins-star hybrid system, a gps-ins system, and a gps-ins-star system. It was concluded that a star field simulator had been developed to serve as a source of radiation for the astro star tracker. A minimum of three simulated guide stars with variable magnitudes were needed to fully test the star tracker performance under simulated mission conditions.

Ward, J. E., Jr., (masters thesis) Dec. 1984, 170P, Report no.: AD-A151827, (Abst) described an autonomous state determination system developed for an earth orbiting satellite using horizon sensors and star trackers. The horizon sensors detect the earth and establish the local vertical reference, while either one or two star trackers make angular sightings of known stars.

Duncan, R., Report no. Nasa-tin-82203, (Abst) catalogs the angular separation of all star combinations for 148 NAV STAR on the onboard software for space transportation system-3 flight and following missions is presented as well as the separation of each pair that satisfies the viewing constraints of using both star trackers simultaneously.

Corson, R., Report no.: Nasa-tin-79515 (Abst), describes a space shuttle inertial measurement unit alignment algorithm. Three crew displayed parameters were considered: (1) the results of the separation angle difference (sad) check for each starpair; (2) the separation angle of each starpair; and (3) the age of each star measurement.

Van der Grinten, H. F., Navigation, vol. 22, Summer 1975, p. 128–134, (Abst), cataloged forty-six celestial lines of position obtained aboard a ship at sea are compared with the position as interpolated between NAVSAT fixes. Least squares adjustment of the combined celestial lines of position yielded a fix with an essentially circular error ellipse. The directional distribution of stars was well balanced. The navsat positions and the combined celestial fix were found to be substantially in agreement. Using the NAVSAT positions as a reference the mean error of well balanced celestial fixes as derived from the data and the method of least squares can be expected to be less than 0.8 nm for a 3-star fix and 0.1 nm for a 46-star fix. These results permit the construction of probability contours around well balanced celestial fixes consisting of various numbers of observations.

Wertz, J. R., Spaceflight, 14; June 1972, p. 206–216, (Abst) asserted that the most essential requirement is an atlas of the three-dimensional positions of all of the stars in the region to be explored and any bright navigational stars that might lie outside this region. In addition to accurate stellar positions, data about the velocities of the listed stars are required together with some means of accurately identifying individual stars—specifically, their absolute magnitudes and detailed spectra. Given the interstellar navigation atlas, there are many ways for the navigator to determine his position and velocity. Effects of high speed motion are discussed, together with the possibility of visual disorientation due to a displacement of the star field caused by small shiets of location.

A method for determining the position of an object in a 3D space has been proposed. An M-array LED pattern is projected onto the object through a lens and the projected array is observed with a CCD camera. Each element of the M-array is time modulated with an M-sequence having different phase. The cross-correlation function between the observed signal and the reference gives information about the phase, and thus the point-to-point correspondence. Then simple mathematical relations are used to determine the exact 3D position of the object. The proposed method is robust to noise and highly efficient. (Measurement of 3-dimensional position by use of M-array projection, Jing-Min Sham Kashiwagi, H.; Sakata, M., dournak Transactions of the Society of Instrument and Control Engineers, vol.25, no.4 p.389–95, 1989).

The monitoring of the motion of an arbitrary mandibular point has been accomplished using a recording system that includes three cameras. Each camera contains a cylindrical lens and a linear optosensor (CCD). Two extra-oral lightweight target flames (2 g) containing each three light emitting diodes are fixed on the patient's teeth. The system fires each LED cyclically and computes their three-dimensional coordinates in a reconstruction unit. From these coordinates another processing unit computes the three-dimensional coordinates of an arbitrary jaw point in a head fixed coordinate system. The computed trajectories are drawn on-line with the help of dedicated 3D viewing hardware on a CRT where they can be directly rotated and zoomed to follow intricate motion details. (Real-time, noninvasive recording and three-dimensional display of the functional movements of an arbitrary mandible point, Mesqui, F.; Kaeser, F.; Fischer, P., Proceedings of the SPIE—The International Society for Optical Engineering vol.602 p.77–84, 1986).

An optical correlator uses a light emitting diode array, in which analog signals from two spaced sensors are correlated in order to locate and track a target. One signal is clipped and digitized and clocked through a shift register, and the other signal is delayed. The shift register is coupled to an LED array, element for element. Each shift register element modulates its corresponding LED element. The delayed signal is also connected at its output to the LED array via a transistor, and modulates each LED element. Therefore, the LED elements emit light in proportion to the product of the two signals. The emitted light is focused onto a CCD imaging array where it is integrated over a period of time before being sent to an integrator and output display device. The output is the correlation function versus the time delay between the two signals. Successive outputs display the movement of targets. Circuit design mitigates inherent errors within the system. (Acoustic Signal Optical Correlator Using a Light Emitting Diode Array, Fogarty, E. J. U.S. Pat. No. 4,805,158, Feb. 14, 1989).

Sze, S., PHYSICS OF SEMICONDUCTOR DEVICES (2nd edition), Wiley-Interscience,New York, N.Y., 1981 (Abstr.) presents a resume regarding the physics and properties of semiconductors including photonic devices such as the LED and semiconductor lasers, photodetectors, and solar cells.

A helmet mounted sight system using CCD technology is described which can be used outside the restricted viewing area of the head up display, but with reduced accuracy. It is noted that the system consists of two pans: the helmet mounted display and the helmet optical position sensor. It is reported that a limited amount of essential information (i.e. aiming reticule, weapon lock, etc.) can be displayed on the surface of the helmet mounted display, noting that the limit is set by the pilot's inability to assimilate further data. Attention is given to the helmet optical position sensor which consists of two triads of LED's mounted on the sides of the helmet and two CCD cameras mounted in the cockpit. Finally, it is concluded that using the CCD to its full capability enables a small compact system to be produced without the need for fast analog to digital converters and a large digital store. (A helmet-mounted sight using C.C.D. technology, STEPHENSON, M.D., Radio and Electronic Engineer, vol. 49, Oct. 1979, p. 511–513, 1979).

U.S. Pat. No. 4,441,783, to Houghton, et al. on Apr. 10, 1984, described improved and inexpensive means for achieving uniform, luminous intensity over a sharply bounded horizontal arc of visibility, and also for achieving a desired vertical arc of visibility, comprise means for projecting light from a diffuse source or an array or mosaic of point sources into a field the horizontal and vertical arcs of which can be precisely defined. The disclosure encompasses two geometric configurations for projecting light, symmetrical and asymmetrical, compound parabolic concentrators, each of which may be constructed as either a reflective cavity or a refractive dielectric, thereby to provide four basic designs for achieving uniform illumination over various horizontal arcs of visibility. In addition, the disclosure encompasses three modes of diffuse light projection to achieve uniform illumination over various vertical arcs of visibility.

U.S. Pat. No. 5,043,924, to Hofmann, on Aug. 27, 1991, describes Method and apparatus for scanning an object transversely to the flight direction or direction of motion of the scanner with a detector row arranged perpendicularly to the direction of scanning.

U.S. Pat. No. 4,994,907, to Allen, on Feb. 19, 1991, describes a color sensing CCD with staggered photosites, e.g., a line sensor with photosites accurately located for color scanning. The sensor includes a plurality of photosites arranged in a two-dimensional, staggered pattern which is repeated across the length of the sensor. Only one photosite is located for every direction perpendicular to the axis of the line image. Individual color filters extend over all the photosites located at the same perpendicular distance from the line image axis. In one embodiment, the filters are disposed on separate transparent members which are aligned and assembled over the photosites.

Mollow, P. A., et al, Journal: Proceedings of the SPIE—The International Society for Optical Engineering, Vol.1347 p. 123–30, 1990 (Abstr.) describes a system using one-dimensional optical devices to perform the desired two-dimensional correlation. The two-dimensional correlation is performed as a series of multichannel time-integrating correlations between each input image line and a reference template that is stored in an electronic memory. The rows of the reference template are introduced into the processor in parallel using a one-dimensional laser diode array. The correlation in the vertical direction is performed using a modified charge-coupled device operating in the shift-and-add mode. Key features of the system include the random access template memory, the custom laser diode array consisting of 64 individually addressed laser diodes.

The basic mathematical formulation of a general solution to the extraction of three-dimensional information from images and camera calibration has been described. Standard photogrammetric algorithms for the least squares estimation of relevant parameters are outlined together with terms and principal aspects of calibration and quality assessment. Three-dimensional testfields and independently determined reference coordinates were used for quality assessment using off the shelf equipment to an accuracy of 1/20/ sup th/and 1/50/ sup th/ of the pixel spacing in row and column direction respectively has been achieved. The system was used to calibrate the vision system of a ping-pong playing high-speed robot tracking table-tennis balls with a 50 Hz rate. Calibration of CCD-cameras for machine vision and robotics, Beyer, H. A., Journal: Proceedings of the SPIE—The International Society for Optical Engineering vol. 1197 p.88–98, 1990 (Abstr). Two sensors were used in a system for autonomous rendezvous and docking manoeuvres in space. The first is a proximity sensor, which is dedicated for distance and angle measurements. The sensor's equipment consists of three units: the position-sensitive detector, the illuminator and the common optics including a c.w. laser rangefinder. On the target side a corresponding reflector complements the necessary equipment to measure distance and angle deviation from boresight direction. The operation wavelengths are between 790 and 850 nm. The second is a high-resolution CCD-camera in combination with a dedicated S/W processor, which is used for distances between 2 m and 100 m. On the target side, a three-dimensional symmetric pyramid reflector configuration is used. The camera processor transforms the actually depicted reflector configuration differences to the expected reflector configuration for boresight position into distance and position information for six DOF. This method can achieve faster update repetition rates (10 Hz) than a common pattern recognition technique. The camera is equipped with a 880 nm wavelength LED illuminator. Optical sensors for position measurements, Schroer, G. et al, Sensors and Actuators vol. 17, no.3–4 p.329–38, 1989 (Abstr).

Optical correlators have been used to investigate real time pattern recognition. 1-D devices have been used to perform the two dimensional correlation in real time by using an array of light emitting diodes (LED's) to input an electronically stored reference image into the processor in parallel. The input scene data is introduced into the processor one line at a time using an acousto-optic device (AOD). Multichannel time integrating correlations are performed in the row direction using the AOD and in the column direction using a charge coupled device (CCD) operating in the time delay and integrate mode. A processor that correlates a 64×44 pixel binary reference image with a 256×232 input scene at video rates was used. A second correlator is a space integrating Fourier transform based correlator. A magneto optic-device (MOD) is used at the Fourier transform plane to rapidly change filter functions. Stalker, K., et al, International Congress on Optical Science and Engineering, 24–28 Apr. 1989 (Abstr).

In another application, a new sensor that can measure the two-dimensional environment of a robot has been reported. This sensor consists of a laser diode and a charge coupled device (CCD) linear array sensor built in a simple optical imaging system with a rotating mirror. The measuring range of this sensor is 250 mm to 6000 mm, and the measuring time for one direction is 1 ms to 10 ms. It can measure distances more than 200 points to obstacles or walls around robot per second. The position of the walls is recognized from these measuring points using a microcomputer system. Development of environment sensor for vehicle robot, Takamasu, Kiyoshi, Journal of the Robotics Society of Japan, Volume: 5, Issue: 3, Pages: 199–202, June 1987 (Abstr).

U.S. Pat. No. 4,970,653, to Kenue, on Nov. 11, 1990, discloses an image processing method that operates on an image from a CCD camera viewing a roadway scene in front of a vehicle to detect lane markers and determine the relationship of the vehicle to the lane. Obstacles in the lane near the vehicle are detected and a warning is given to the driver. The method uses template matching techniques or a hough algorithm to detect the lane markers or road edges.

The components and instruments necessary to carry out the present invention are available commercially. (Components and peripherals, buyers guide, EDN VOL.: v33 n15 p253(27), Jul. 21, 1988, Lasers & Optronics, v7, n4, p76(3), April, 1988.) For example, Infrared Associates' infrared detectors and related accessories have applications in analytical instruments, medical thermography, thermal imagers, air-borne scanners, high-altitude balloon experiments, laser range finders and high-speed missiles. They come in single and multi-element arrays and can be packaged in a variety of metal or glass dewars, which can be cooled or uncooled. The matched preamplifier circuits can be provided in single or multi-channel configurations. Infrared Associates, Inc., 1000 Route 130, Cranbury, N.J. 08512. Automated Waveform Digitizers LeCroy Corp.'s line of high-performance automated single-channel, waveform digitizers provides high speed wave measurement and analysis instrumentation. Among the benefits the devices provide are higher accuracy measurements, extended memory-length waveform recording, pre-and post-trigger waveform recordings, high resolution transient capture, digital signal processing and analysis and total programmability. LeCroy Corp., 700 Chestnut Ridge Rd., Chestnut Ridge, N.Y. 10977–6499. A Red-emitting diode laser is available in the visible-wavelength range. NEC's Model NDL 3200, operates at room temperature and will run more than 3,000 hours without performance degradation. Fabricated in indium gallium arsenide phosphide, the device emits a minimum of 3 milliwatts at 680 nanometers. The diode has a back-facet monitor photodiode and is offered in a three-pin, 9-millimeter TO can. This diode laser has rise and fall times of 400 nanoseconds. NEC Electronics, Inc., P.O. Box 7241, Mountain View, Calif. 94039. The 4000 series of lasers from Continental Laser Corp. feature a two-tube tandem design which virtually eliminates any down time, according to the manufacturer. Two large-diameter solid Invar rods provide a 50-inch resonator structure for stability. The systems are designed for OEM, industrial, medical, entertainment and scientific applications. Multi-line power specifications are 8 to 12 W for the argon models and 2.5 to 4 W for krypton. Light regulation, prism wavelength selector, remote-control module and etalon assembly options are available. Continental Laser Corp., 805 E. Middlefield Rd., Mountain View, Calif. 94043. XMR Inc.'s Model 5100 excimer laser is designed specifically for a long lifetime of industrial use. Capable of generating a continuous 150 watts of average power or 200 watts for shorter periods, the 5100 features a magnetically switched PFN and can be incorporated into custom laser-based systems. XMR, Inc., 5403 Betsy Ross Dr., Santa Clara, Calif. 95054. Air- and water-cooled argon and krypton lasers, American Laser Corp., range in output power from 1 to 8 watts, continuous wave, multi-time configuration. The units are available in argon, krypton and mixed gas and offer additional features such as single-line operation, TEM sub.00, extended-life tube, tunability, UV and service contracts. American Laser Corp., 1832 S. 3850, W., Salt Lake City, Utah 84104. A hard-sealed, integral-mirror, plane-polarized helium-cadmium laser, the Model 43001, exhibits a typical polarization ratio higher than 1000:1. Measuring 4×4×24 inches with a full Invar resonator, this laser offers high power stability ([plus-or-minus]) 1 percent over one hour), low noise ([is less than or =]) 1 percent rms) and an extended warranty period (4000 hours or one year to half power). The laser is also available with random polarization or with frit-sealed, fused-silica Brewster windows for those users switching between 325 and 442 nm operation. Liconix, 1390 Borregas Ave., Sunnyvale, Calif. 94089.

A digital video CCD Camera and scientific investigations is available. This camera features high-resolution, true random triggering, high-light gain with optional image intensifiers, digital and standard video outputs, digital frame store and on-board video monitor, digital delay and exposure-time controls, and sequence operation for stroboscopic photography. Applications include ballistics, detonics and other high-speed photography including laser and fusion research and spectroscopy. Marco Scientific, Inc., 1055 Synnyvale-Saratoga Rd., #8, Sunnyvale, Calif. 94087.

A tunable $CO_2$, computer-tuned laser oscillator with center—and offset-frequency locking provided by a built-in Stark cell. The Strak cell and frequency stabilizer can be used in any kind of ranable $CO_2$ laser. Ultra Lasertech, Inc., 6415 Viscount Rd., Mississauga, Ontario, Canada L4V 1K8. A flashlamp-pumped Alexandrite laser, a CO laser and low-light-level laser receivers at are available from Photon Interactions, 5645E General Washington Dr., Alexandria, Va. 22312.

A recent terbium gallium garnet that has a low thermal conductivity and low optical absorption rate, useful in Faraday rotators that run in high-average power applications. It has a wide range of transparency, from 500–1500 nm, and low optical absorption. Allied-Signal Inc., Sales Department, P.O. Box 410168, Charlotte, N.C. 28241-0168.

Herschelian-mounted remote sensing receivers and radiometric systems are available from Lambda/Ten Optics. They have Herschelian-mounted Newtonian telescopes and collimators. These all-reflective instruments have no central obscuration and locate the focal plane to the side of the collimator/telescope. Used as a collimator, the Lambda/Ten "NC Series" projects a collimated beam from the light source to infinity. As a telescope the unit images light from a distance to the focal plane. The series is ruggedized in a heat-treated aluminum tube, fully self-supporting, and mountable in any orientation. Lambda/Ten Optics, 1 Lyberty Way, Westford, Mass. 01886.

The present invention solves the problems left unresolved by the prior art generally and by deVos et al., supra, specifically, namely the problems of locating a point on the surface of very large tracts of hilly or otherwise uneven land. A principal application of the invention will be in locating an earth moving machine precisely on a tract of land undergoing grading to enable control of the machine to assure that the proper grade pattern is accomplished on the tract. The term "locate" means, in the context of this invention, to determine and define the location of, e.g., an earth moving machine. The term "machine" as used here means a machine which is movable relative to a tract or area and performs a function at the point where it is located, e.g., an earth moving machine which cuts, grades, slopes, picks up, drops or otherwise modifies the earth at its location, modifies a workpiece in a manufacturing operation, provides location at data in surveying, etc. A hand held survey instrument is another important system in which the invention will be embodied. In the sense used here, "machine" may be a part of a larger machine or system. For example, a machine may mean a milling tool, label applicator, etc. The term "tract" will most often be used in reference to a tract of land which is being developed. However, a tract may be a very large geographic area, e.g., the Los Angeles, Calif., basin, etc. A development tract may include several hundred or several thousand acres such as is frequently developed in large western community projects or industrial projects. In an industrial context, the term "area" will be used in reference to a geometric area upon which the machine operates, one or more points at a time, to accomplish a predetermined result. For example, if a large number of items are being carried by a conveyer belt from a manufacturing operation and it is desired to place a label or marker on each such item, then the area would be that portion of the conveyer belt which is accessible to the machine.

SUMMARY OF THE INVENTION

A system for defining the location in three dimensions and, optionally, the direction of travel of a machine, survey instrument, or other object or device is provided. The system comprises a sensing instrument and at least three point sources of radiation. The sensing instrument is capable, either simultaneously or in a series of readings, of determining very precisely the angular relationships defined by imaginary lines passing through the sensing instrument and the respective point sources of radiation by sensing radiation therefrom. Data defining the location of some or all of the point sources of radiation, as defined by survey stakes or otherwise, along with the angular relationships measured by the sensing instrument are input to a computer. The computer calculates circles, three-dimensional geometric figures, defined by the angular relationships measured by the sensing instrument and the data defining the point sources of radiation and, using known geometric relationships relating to the circles or figures and triangles defined thereby computes data defining the location of the sensing instrument relative to the point sources of radiation. Plural readings, over period time, permit calculation of the direction of travel, if the sensing instrument is moving.

The present invention comprises a method of defining the location of a machine in relation to a tract or area. A plurality of point sources of electromagnetic radiation, superbright LEDs being preferred, are positioned, respectively, at each of at least three reference points in known relationships with respect to each other and to the tract or area. They may be in a straight line or otherwise. They may be in the same plane, but need not be co-planar with each other. An angle-measuring detector for electromagnetic radiation from at least three of the aforesaid point sources is position at an unknown point $P_0$ that is in known relation to the machine the location of which is to be determined. A sensor system comprise at least one and preferably six or more CCD arrays, is preferred as the angle measuring detector. Angles defined by $P_0$ and a first set of at least two of said reference points and angles defined by lines $P_0$ and at least one additional set of at least two of said reference points are measured, the first and each of the additional sets of reference points being different from each other and being selected such that a geometric figure defined by $P_0$ and the first set overlaps a geometric figure defined by $P_0$ and at least one additional set of reference points. The geometric figures are preferably circles or spheres, to permit easier calculation, however any geometric figure may be used. The term "geometric figure" as used here means a planar or solid figure the circumference or surface of which is defined by a known mathematical formula. Data defining the location of the reference points with respect to each other and with respect to said area or tract and data defining said measured angles are input into a computer. The computer is programmed or hard wired, or uses firmware, to calculate from said input data the position of $P_0$ in relation to said tract or area. The results of the computation are reported in a form suitable for use by humans or machines. The machine may be an earth moving machine and the reference points in a known relationship to relevant metes and bounds of a tract of land upon which the machine is to work. The machine may be a handheld survey instrument, an instrument for locating ones self, or any other object or device that moves or is moved and that requires positional definition.

As a system, the invention is useful for locating and defining the position of an object in relation to a known area or tract. A plurality of point-sources of electromagnetic radiation, e.g. superbright LED's are located, respectively, at each of at least three reference points in defined relationship to each other and to said area or tract. An angle measuring sensor for said electromagnetic energy, e.g. a CCD sensor system, is positioned at an unknown location $P_0$ and in known relation to the object the location of which is to be defined. The sensor is constructed and configured to measure angles defined by lines extending through $P_0$ and at least two of a first set of said reference points and angles defined by lines extending through $P_0$ and at least two of at least one additional set of reference points, respectively, the respective sets of reference points being different from each other and being selected such that a geometric figure defined by $P_0$ and the first set overlaps a geometric figure defined by $P_0$ and at least one additional set of reference points. A computer is connected to said sensor for receiving data defining said measured angles and input data defining the relationship of said reference points to each other and to said tract or area and for computing data defining the location of $P_0$ in relation to said tract or area and means are provided to cause the computed definitional data signal derived from said computed data defining the location of $P_0$ to a display or control means. The definitional data signal my be used for controlling the movement or operation of the object. The system may function in a single plane or in three dimensions and may use three-dimensional data to define location in a single plane, or in three dimensional space.

BRIEF DESCRIPTION OF THE DRAWINGS

FIGS. 1 through 10 are geometrical diagrams showing angles and circles defined by or passing through particular points. These diagrams are referred to in the specification to aid in understanding the proofs of the methods described herein.

FIGS. 1 and 2 depict the relationship of circles and arcs defined by points $P_0$, $P_1$ and $P_2$ and the angles defined by three points, a point $P_0$ that is to be located or defined, and two points $P_1$ and $P_2$ in known relationship to each other.

FIGS. 3 depicts a set of overlapping circles defined by the points and angles defined as in FIGS. 1 and 2 when the angle A is less than 90°. The point $P_0$ will lie on either of the two partial circles defined by angle A with respect to $P_1$ and $P_2$.

FIGS. 4 depicts a set of overlapping circles defined by the angles defined as in FIGS. 1 and 2 when the angle A is greater than 90°. The point $P_0$ will lie on either of the two partial circles defined by angle A with respect to $P_1$ and $P_2$.

FIG. 5 depicts a set of overlapping circles defined by lines drawn through $P_0$ and, respectively, $P_1$, $P_2$ and $P_3$ wherein three angles, A, B and C, are generated.

FIG. 6 depicts two overlapping circles defined by points $P_0$, $P_1$, $P_2$ and $P_3$, showing the relationship of the centers of the circles to the points as a means of calculating the position of $P_0$.

FIG. 8 depicts circles defined by points $P_0$ and, respectively, $P_1$, $P_2$ and $P_3$ in the special case where the latter points lie in a straight line.

FIG. 9 depicts a system for locating an earth moving machine on a tract.

FIG. 10 depicts schematically a top plan view of a radiation sensor system contemplated by this invention.

DESCRIPTION OF THE PREFERRED EMBODIMENT

The following discussion explains a method to identify the coordinate location of a point $P_0$ on a tract of land. The coordinates of at least three points $P_1$, $P_2$, and $P_3$ are known. The method entails placing an instrument at location $P_0$ which is capable of receiving and differentiating simultaneously between point sources of light emitted from the points and measuring the angles from these points to $P_0$. Let Angle A=$\angle P_1P_0P_2$, B=$\angle P_1P_0P_3$ and C=$\angle P_2P_0P_3$. Angels A, B, and C are assumed to be between 0 and 180 degrees.

Figure 1:
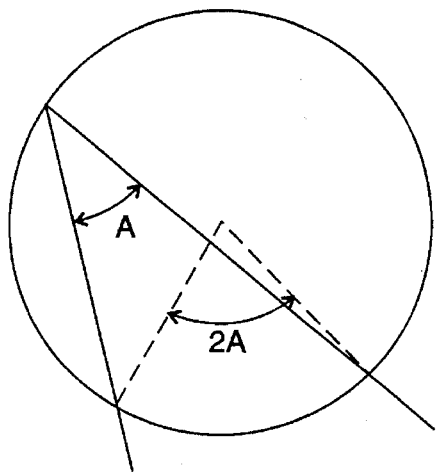

From a geometry theorem we know if an angle is inscribed in a circle, then the measure of the inscribed arc is twice the measure of the inscribed angle (see FIG. 1 ). It follows if angle A can be measured at $P_0$, $P_0$ lies on a circle radius $r_1=d_1/2\sin A$ where $d_1$ is the distance $P_{1 \text{ to } P2}$. The center of the circle will lie on a line which is a perpendicular bisector of $P_1P_2$ a distance $d_1/2\tan A$ from $P_1P_2$. Furthermore $P_0$ will not exist on the portion of the circle which lies beyond $P_1P_2$ from $P_0$ (see FIG. 2), except in the case where A=90 degrees.

Figure 3:
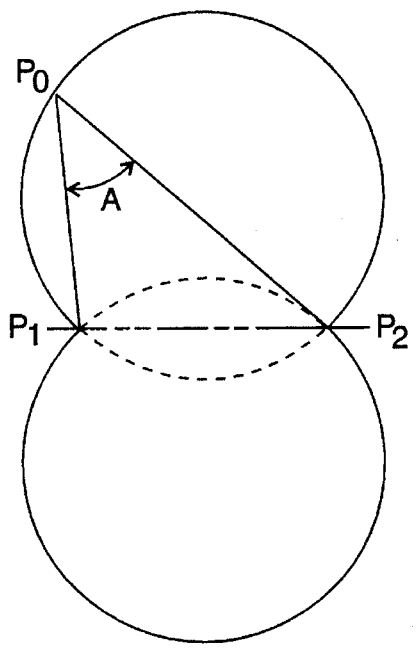
Figure 4:
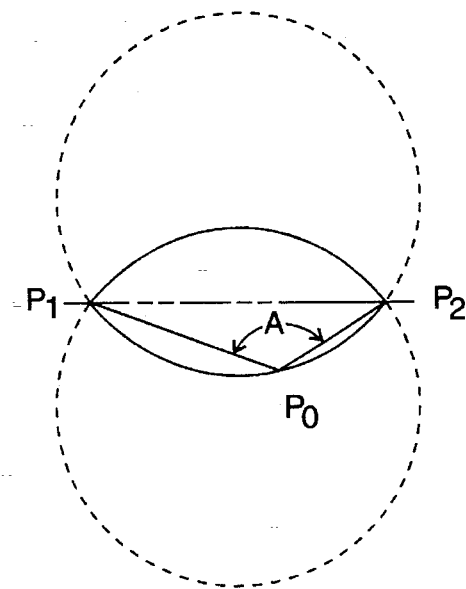

Since $P_1$ and $P_2$ are at known locations and the angle A at $P_0$ is known, the position of $P_0$ can be any point on the portions of two circles located symmetrical about $P_1P_2$ (see FIG. 3). If A is less than 90 degrees, the set of solutions for angle A, when graphically depicted, will appear as in FIG. 3. If A is greater than 90 degrees the set of solutions for angle A, when graphically depicted, will appear as in FIG. 4. If A=90 degrees then $P_0$ could lie anywhere on the circle, radius $d_1/2$ which centers at mid point of $P_1P_2$. Separate solutions of angels B and C with respect to $P_0$ will also exist as with A.

Figure 5:
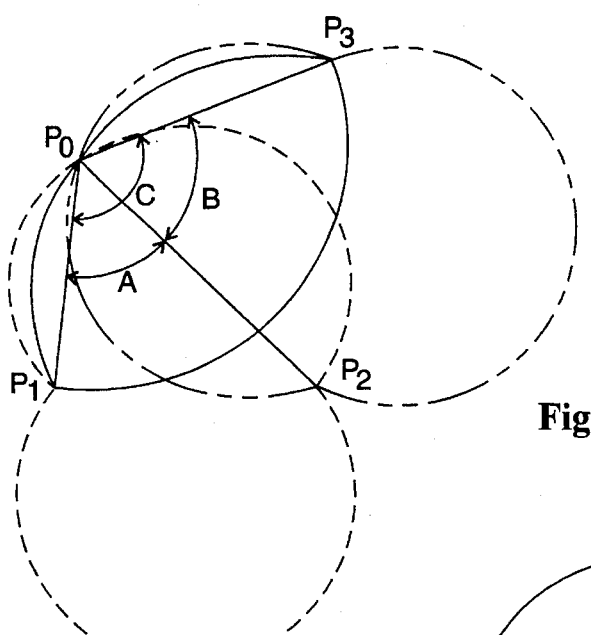

If the measure of angles A, B, and C are taken at any given moment, the location of $P_0$ will be the common intersecting point of the three sets of solutions defined by angles A, B, and C at $P_0$ (see FIG. 5). If the points $P_0$, $P_1$, $P_2$ and $P_3$ lie on the same circle a solution cannot be found. If the degenerate case such as this arises, a solution may be found by observing an additional known point or points.

Figure 6:
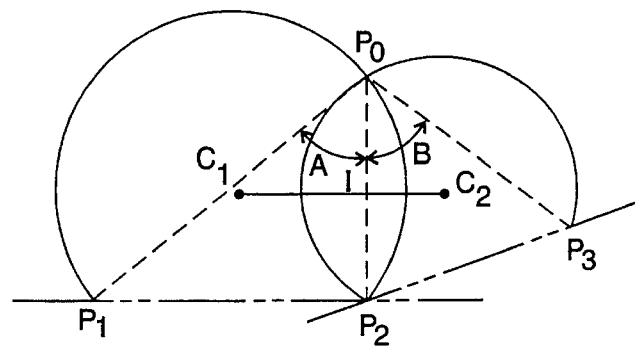

More than one mathematical calculation can be used, taking advantage of the capabilities of high speed computer technology. Here is an example. From $P_0$ angles A and B are measured. The location of the centers of the two overlapping circles are found at $C_1$ and $C_2$. The line through $C_1$, $C_2$ is a perpendicular bisector of $P_2P_0$ at the point I. $P_0$ lies on the projection of $P_2I$ a distance $P_2I$ from I (see FIG. 6). Each of these steps are routine coordinate geometry calculations. The coordinate location of $P_0$ thus computed can be tabulated. All the possible combinations of $P_0$ with angles to $P_1$, $P_2$, $P_3$ and so forth that lie within the tract of land in like manner can be calculated and tabulated. A computer analysis of the tabulated data will identify $P_0$. The greater number of known points analyzed, the higher expected accuracy of the location of $P_0$.

Figure 7A:
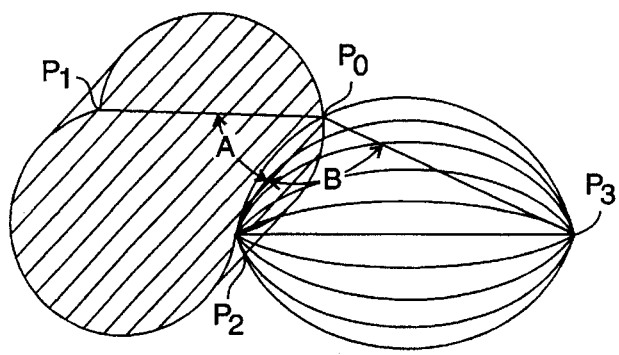
FIG. 7A depicts, in plan view, surfaces generated by $P_0$ for angels A and B rotated about the axis of $P_1P_2$ and $P_2P_3$ respectively.
Figure 7B:
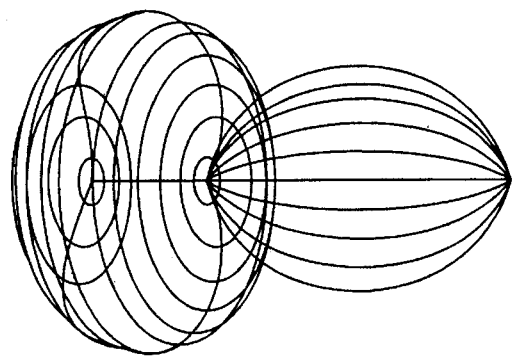
FIG. 7B depicts, in front elevational view, surfaces generated by $P_0$ for angels A and B rotated about the axis of $P_1P_2$ and $P_2P_3$ respectively.

With the location of $P_0$ established in the horizontal plane, the vertical position can be readily identified if the elevation of any of the known points, $P_1$, $P_2$, $P_3$, and so forth is known. This is done by measuring at $P_0$ the vertical angle to the point of known elevation and calculating the elevation at $P_0$. The more known points that can be sampled the greater expected accuracy of the calculated elevation. In the preceding discussion it was implied that the angles to establish the horizontal position of $P_0$ were horizontal components. If the measure of angle A is taken in a plane that includes $P_0$, $P_1$, and $P_2$, then $P_0$ will lie on the surface generated by rotating the circle segment (as in FIG. 3) about the axis $P_1P_2$. If angle B is also measured in this manner, $P_0$ will lie on the intersection of the two respective generated surfaces (see FIG. 7). A third surface generated by angle C will intersect the first two surfaces at the (x,y,z) position of $P_0$. If more than one solution for $P_0$ exist within the limits of the tract by observing three points, the location of $P_0$ can be resolved by observation of one or more additional known points. The greater number of points sampled the greater expected accuracy. Mathematical solutions can be obtained by computer calculation. Here is an example method. The scaler product of two vectors in three dimensional space is defined $$\overline{P_0P_1} \cdot \overline{P_0P_2} = |\overline{P_0P_1}| \, |\overline{P_0P_2}| \cos A.$$

Since the angle A and the coordinates (x,y,z) for $P_1$ and $P_2$ are known, any set of values (x,y,z) for $P_0$ that satisfy the scaler product will lie on the surface dictated by angle A as previously described. A systematic search of the horizontal and vertical limits of the tract can be made. Values that satisfy the equation are tabulated. The process is repeated for angles B, C, and so forth. A computer analysis of the tabulated data will identify $P_0$. The first search could be done at a larger interval to more rapidly identify the general area of solution. A reiterative process at the general area of solution can be followed to yield the desired accuracy of $P_0$.

In either case, if $P_0$'s location is known and $P_0$ is moving, the needed area of observation can be set as a function directly proportional to the velocity in the direction which $P_0$ is moving and inversely proportional to the frequency of output readings. Furthermore by placing the known points at the edge or outside the tract of land the calculation process will be simplified by limiting the number of possibilities to evaluate. If restrictions such as buildings or terrain exist it may be advantageous to use several points at known locations.

Figure 2:
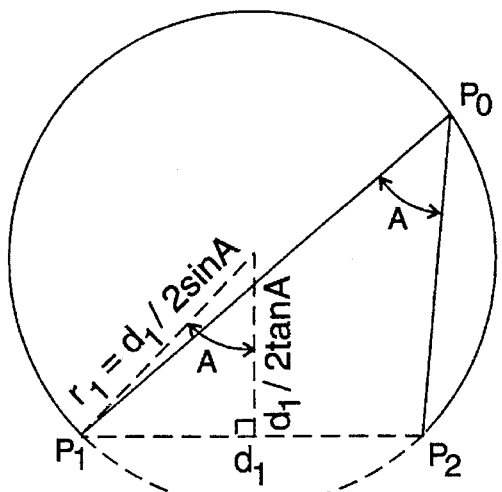
Figure 8:
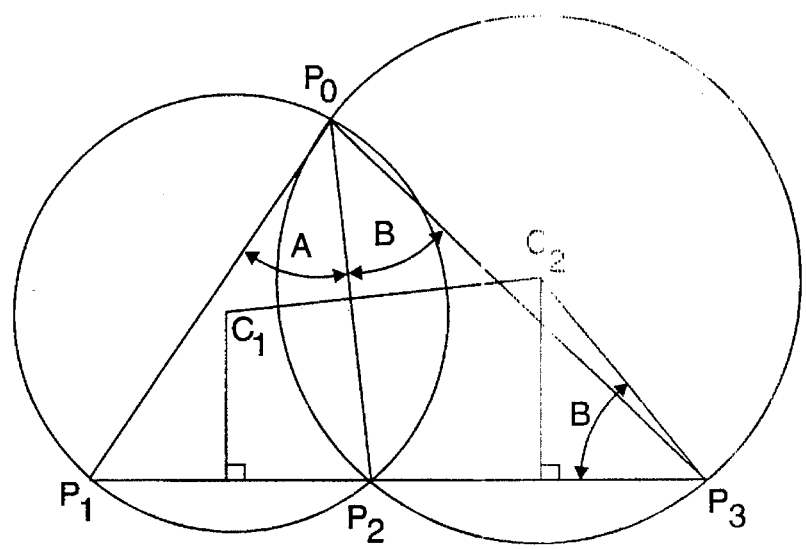

In the special case where the points lie on a straight line on or adjacent the tract or area of interest, the location of $P_0$ can be calculated as in the general case or as described here, making reference now to FIGS. 1, 2 and 8. The coordinates of points $P_1$, $P_2$ and $P_3$ are known. These three points preferably but not necessarily would be at one edge or slightly outside the project to be worked upon and lie on the same line with each other. This arrangement is for simplification and to eliminate one of two solutions that is mathematically possible.

As in the general case, the detecting instrument at $P_0$ is capable of receiving and differentiating simultaneously between at least three point sources of light emitted from the points $P_1$, $P_2$ and $P_3$ and measuring the subtended angles from these points to location $P_0$.

The specific geometric theorem used in this invention may be stated as follows: If an angle is inscribed in a circle, the measure of the inscribed arc is twice the measure of the inscribed angle. This theorem is illustrated in reference to FIG. 1.

Thus, it follows that if a fixed angle A can be measured between $P_1$ and $P_2$ through $P_0$, then the location $P_0$ must lie on a circle. Circle 1 is thus defined by $P_1P_2$ and $P_0$ lying on the circumference. The radius $r_1$ of circle 1 is defined as follows:

$$r_1 = \frac{d_1}{2 \sin A}$$

where $d_1$ is the distance between $P_1$ and $P_2$. The center of circle 1 will lie on a line that is a perpendicular bisector of line $P_1P_2$ a distance $d_{1'}$, see FIGS. 2 and 8. The distance $d_{1'}$ is defined as follows:

$$d_{1'} = \frac{d_1}{2 \tan A}$$

Another circle, circle 2, that overlaps circle 1, is defined by having $P_3$, $P_2$ and $P_0$ on the circumference thereof, see FIG. 8. A fixed angle B can be measured between $P_2$ and $P_3$ through $P_0$, then the location $P_0$ must lie on a circle. Circle 2 is thus defined by $P_2$, $P_3$ and $P_0$ lying on the circumference. The radius $r_2$ of circle 2 is defined as follows:

$$r_2 = \frac{d_2}{2 \sin B}$$

where $d_2$ is the distance between $P_2$ and $P_3$.

Referring again to FIG. 8, it will be seen that the center point of Circle 2 will lie on a line which is the perpendicular bisector of the line $P_2P_3$ a distance $d_2$, $$d_{2'} = \frac{d_2}{2 \tan B}.$$

The intersection of Circle 1 and Circle 2 will be at the point $P_2$ and location $P_0$. A second solution also exists wherein $P_0$, (not shown) is on the opposite side of line $P_1P_2P_3$; however, the points $P_1$, $P_2$ and $P_3$ are located relative to each other and to the tract such that the solution described herein is used.

Since the points $P_1$, $P_2$ and $P_3$ are fixed and in known relationship to each other and to the tract or area, or to a reference point, the coordinates of $P_1$, $P_2$ and $P_3$ can be entered into a digital computer as known constants. Likewise, the midpoints of lines $P_1P_2$ and $P_2P_3$, as well as the bearing to the two circle cemers $C_1$ and $C_2$, are fixed and need be calculated only once at the beginning of a project.

In operation the two angles, A and B, are measured as the variables. Using the data now available, the centers of the two circles $C_1$ and $C_2$, are calculated. A line through $C_1C_2$ is the perpendicular bisector of the line $P_2P_0$. A well-known calculation known as the "right angle tie" defines point $P_i$, the point of intersection of the lines $P_0P_2$ and a line through $C_1C_2$. It is then an easy matter to define a point extended a distance along the line $P_2P_i$ that is equal to the distance $d_{1/2}$ which is equal to the distance from $P_2$ to $P_i$, which has been calculated as described, to thereby define the position of location $P_0$. It is noted that if the measure of A or B is between 90 and 180 degrees the cemer of the respective circle will lie on the opposite side of $P_1P_2$, $P_2P_3$. This holds true since the tangent of any angle between 90 and 180 degrees is negative. It is also noted that if $P_1$, $P_2$, $P_3$ and $P_0$ all lie on the same line, $P_0$ cannot be located. If $P_1$, $P_2$ and $P_3$ not lie on the same line and the angles A and B are such that $C_1$ and $C_2$ occupy the same point the circles are congruent and concentric and a unique solution for $P_0$ cannot be identified. If the degenerate case such as this arises, a solution may be found by observing an additional known point or points.

The method comprises the following steps.

(a) Point electromagnetic radiation sources, e.g., point-light source transmitters, are placed at three or more reference points that are in known, defined relationship to each other and to the tract or area of interest.

(b) An angle-measuring point light detector for radiation transmitted from the reference points on or in a known relation to the machine;

(c) The angles from the detector to the respective reference points are measured very precisely;

(d) Data defining the coordinates or other definition of the reference points are input into a computer or other calculating system.

(f) Data defining angles are input into the computer.

(g) The mathematical calculations described to define the location $P_0$ relative to one or more reference indicia relative to the area or tract are executed, typically by a computer that receives data directly from the sensors, thereby define the location $P_0$ on or in relation to the tract or area of interest.

(h) The data, including the definition or the area or metes and bounds of the tract, grade stake locations, quarter section locations, etc., may, in the preferred embodiment, be reported or displayed in real time to the machine operator and/or used as a controlling signal for controlling the movement of the machine.

In a typical and preferred system, the relevant metes and bounds of the tract may be displayed on a video display screen and the position of the machine, i.e. of location $P_0$, on the tract is displayed, along with contour lines, etc., or such other information as my be desired.

A computer for receiving input data defining the relationship of at least three of the points of known location and relationship to each other and to the tract data and the angles defined by these points and the machine, i.e. $P_0$, on the tract area provides output to assist a human operator to control the movement of an earthmover, or other machine, or to control movement of the machine directly.

The point-source light may send out a pulse coded sequence of light bursts which serves to identify the particular point to send short, intense pulses for longer range without large average power requirements or special equipment. The light transmission is preferably omnidirectional in the X and Y direction and covers approximately 30° above and below the X-Y plane in the Z direction. In a preferred embodiment, the light transmitter consists of a radial cluster of superb fight infrared light emitting diodes or diode lasers with lenses. The typical emission maximum is around 880 Nm. The transmitter, once activated, can continuously transmit the pulse coded information sequence. A Dalsa, Inc., CCD camera having a CCD sensor having 256×256 pixels and a 50 mm lens using an infrared filter to block light below 800 nm may be used in connection with an infrared superbright light emitting diode, Siemens pan No. SFH484 as the point source. Greater accuracy can be accomplished using, for example, a 4000 pixel array such as is market by Dalsa. These are, of course, merely exemplary.

It is, of course, inherently possible to determine the vertical angle of the location $P_0$ relative to any point source of light. Since this location is defined in terms of distance from any given point, then the vertical elevation relative to a given point source, e.g. $P_1$, may be calculated using standard trigonometry and displayed along with the X-Y or lateral position of the location to be determined.

One or more optical receivers are mounted on or in a fixed relation to the machine or as part of the survey instrument. These receivers scan the site and receive the pulse-coded sequence and determines very precisely the two angles of interest. The constant data defining the location of the points relative to each other and to the relevant metes and bounds of the tract to be worked upon and a reference point on or in known relation to the tract, are fed into a digital computer. All the constants may be determined and digitized well in advance or on the work site. These constants are stored by and used by the processor of the computer as needed. The angular data are digitized and fed into the computer. The calculations as described above are then carried out. The calculation program may be built into the computer as its operating algorithm or introduced into the computer as firmware or software. Any number of programs for carrying out the necessary calculations can be written, once the sequence of calculations is disclosed, and the nature of the program is not an essential feature of this invention.

The points may also be connected by line or radio link and transmit information between themselves and to the sensing unit at location $P_0$ which may be fed into the computer. The sensing unit preferably includes a microprocessor, i.e. a computer, that enables the computations to be made electronically. Any kind of computer, analog or digital, hard wired special purpose or programmed general purpose, may be used.

It will also be understood that the position of the points may be determined by an inverse calculation, i.e. using the algorithm and method described above in an inverse manner. Thus, the position of $P_0$ relative to the tract or area, nearly always on or over the tract or area, is determined. For example, $P_0$ may be positioned in a known coordinate relationship to specified points, comers, edges, etc. of the tract or area. The point sources are then placed in a linear array as may be convenient to avoid interference by plants, hills, rocks, etc. The angles described above are then measured as described by the sensor at $P_0$ and computed using the computer at $P_0$ and the inverse of the calculation run by the computer thereby defining the precise relationship of the points to the tract or area. $P_0$ may then be moved and the position defining calculation run as described.

The output of the computer may be in any desired form, e.g. by printing out the X and Y coordinates which locate the machine, etc., but, preferably, by displaying, plotting or otherwise providing a visual depiction of the location of the machine on the tract or area in a scaled relationship to relevant metes and bounds or other reference points.

Another important application of the invention is to provided numerical data for known numerical controllers for guiding machines over a tract or an area. In this application, the output of the computer provides the reference data which permits the numerical controller to move the machine to any desired location.

The preceding discussion was directed to the use of cartesian coordinates have been used to define an X-Y location. The same system is equally applicable to define points or directions in the XZ or YZ planes or three dimensionally in an XYZ or polar coordinate defined space. Polar coordinates may be used to define locations in a single plane or in 3-dimensional space.

As discussed above, see FIGS. 7A and 7B, the present invention may be used to locate $P_0$ in three dimensional space. This will be of great value in grading hilly terrain, in surveying, in military operations and in locating any tool, machine, etc. in space.

In a preferred embodiment, the image of the point source transmitter is focused on the sensitive elements of a photo detector array. The electronics scan the array and determine the position of the image on the detector surface. Since the image position on the detector corresponds to the location of a particular point, e.g. $P_1$, the precise angle between such point, e.g. $P_1$, and another point $P_2$ can be determined. The radiation sensing devices can be mounted in the sensing system with great exactitude relative to each other. The radiation sensing devices can also be mounted and position to have precisely known relationships between the fields of view of the respective sensors, or of a single sensor in different positions. A single sensor system with wide-angle sensors would be capable of viewing, in fields that meet or overlap, in a 360° solid angle, with, perhaps, some minor interference from the hardware of the sensor system per se. This capability eliminates the need for mechanical or electro-mechanical angle measuring or calibrating devices. Using point sources at known locations, calibration can be checked or adjusted, if ever necessary using only the sensor and computer systems. This is very simple where the two point sources are detectable by a single sensor in the sensor system.

Although various types of photo detectors can be used including photodiode arrays, vidicon tubes and others, the preferred method involves the use of charge coupled devices (CCD). CCDs have precision pixels (picture element) arranged in various formats. The image scanning is simple to do with computer driven image analyzers. In addition, systems with high IR sensitivity are available. To increase specific signal to background signal, it may be desirable to place an IR pass filter in front of the detector; all other light will then be blocked. CCD image sensors such as manufactured by Dalsa, Inc., Waterloo, Ontario, Canada, are suitable.

Figure 9:
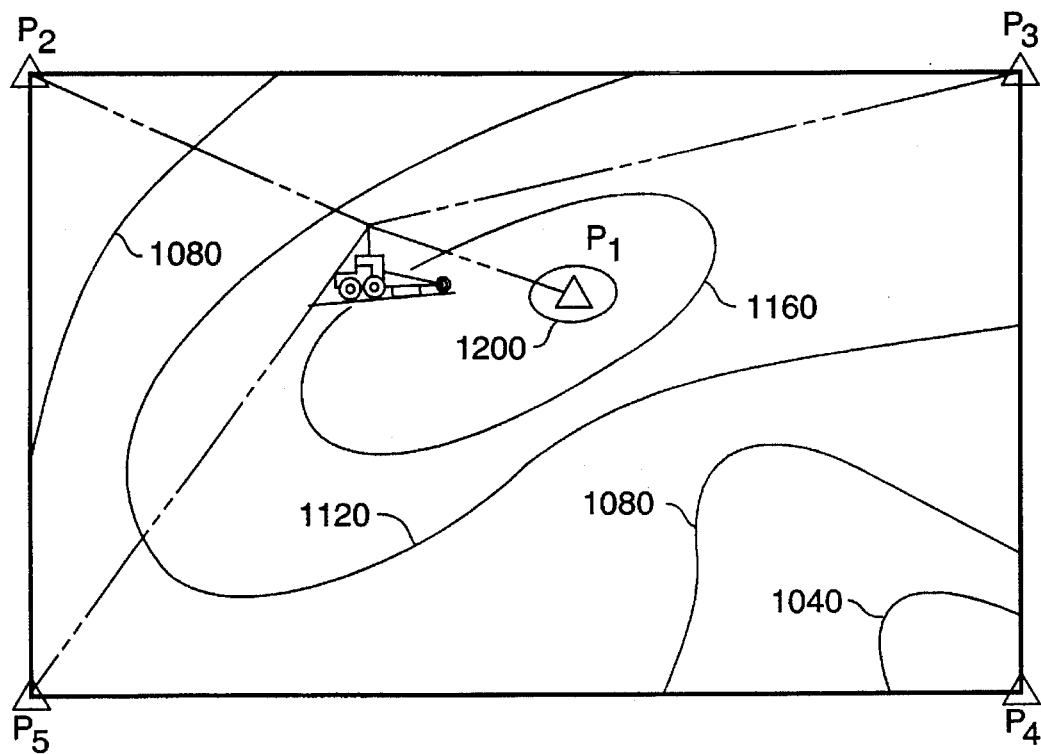

FIG. 9 depicts a tract of land, depicted as rectangular but may be of any shape, with an earth working machine having a radiation sensing instrument at $P_0$ and point radiation sources at $P_1$, $P_2$, $P_3$, $P_4$, and $P_5$. The tract is defined as hilly by the contour lines at 1040, 1080, 1120, 1160 and 1200. Dashed lines from $P_0$ to various of the point sources illustrate how any set of point sources may be used to fix the location on the tract of $P_0$ and the earth mover to which it is affixed using the calculations just described.

Figure 10:
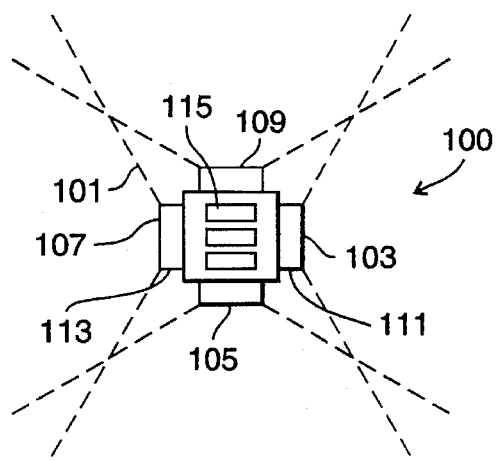
Figure 11:
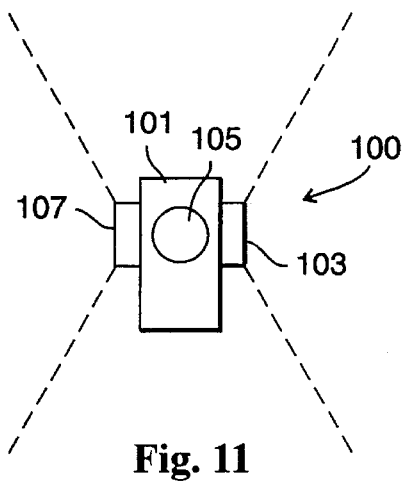
FIG. 11 depicts schematically a side elevational view of the radiation sensor system depicted in FIG. 10.

In a preferred form, the sensing instrument contains sufficient sensing elements to permit simultaneous viewing in 360° horizontally and up to 45° above and 45° below the horizon in the vertical direction. The sensors can, if the application warrants or requires, measure 90° above and below the horizon. Such an instrument is depicted schematically in FIGS. 10 and 11. FIG. 10 is a view looking down on the top of the sensing instrument. The instrument 100 comprises a housing 101 of any convenient configuration and a plurality of CCD sensors, four being depicted at 103, 105, 107 and 109, with dashed lines showing the angle in the horizontal plane that the respective CCD detectors scan. In practice, six or more such sensors might be used to obtain maximum accuracy and precision in all directions, four being depicted simply for simplicity. It will be noted that the fields of view overlap. If the same point source is read by two CCD's, the duplicate reading is eliminated by computer software or otherwise, or used to calibrate or check the accuracy of the instrument. FIG. 11 shows an elevation view of the same instrument with three of the CCD's being shown, with dashed lines depicting the vertical field of view. Such an instrument will detect and calculate the angular relationships to points any where in the 3-dimensional space scanned by the CCD's. Returning to FIG. 10 briefly, a series of three liquid crystal displays 111, 113 and 115 are conveniently provided in the sensing instrument if its to be used as a one-man carried survey instrument. These LCD may display data defining the location of $P_0$, distances, direction of travel, etc. The sensing instrument may rely on only one CCD or equivalent radiation detector by permitting the CCD to rotate in precisely defined angular steps, a reading being taken at each step. For example, a reading may be taken at three or four positions that are precisely defined as to angular relationships to each other's position.

Figure 12:
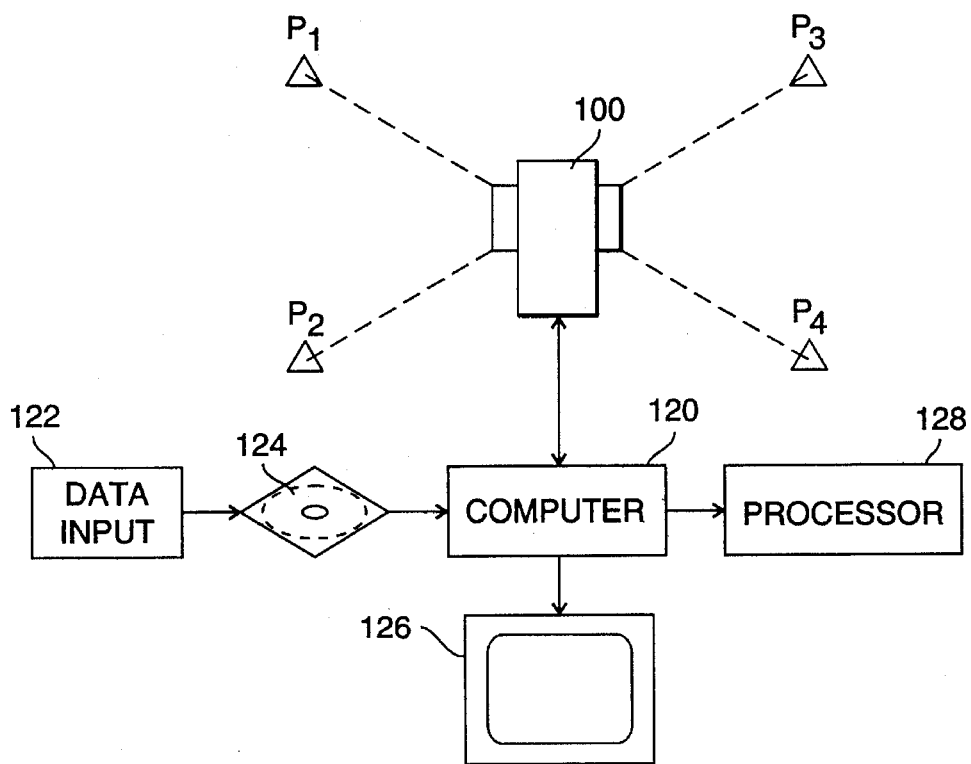
FIG. 12 is block functional diagram of an exemplary system in accordance with this invention.

An overall system is depicted in FIG. 12. The sensing instrument 100, positioned to sense radiation from at least three points, e.g. $P_1$, $P_2$, $P_3$ and optionally $P_4$, sends data defining the angles defined to the computer 120, which sends data for display on the LCDs on the instrument 100 back to the instrument. Data input from scalers, keyboards or other input devices indicated generally at 122, defining the position of at least three of the point sources of radiation is fed directly into the computer or recorded on a diskette 124 and loaded into the computer 120. The computer calculates the data defining the position and, if desired, the direction and/or velocity of movement of the sensing instrument at $P_0$ to the sensing instrument for display. Optionally, the position defining data are sent to a video display 126 or to any other recording or display device associated with the sensing instrument 100 or remotely through conventional data transmission. The position defining data may also be sent to a processor 128 that may convert the data into control signals for controlling an earth grading blade, controlling the direction of travel of an earth mover, or for any other control purpose.

One advantage of the present system and method is that only the fixed point source radiation transmitters must be precisely located in relation to the area or tract upon which the machine works. This can be done with great precision using known surveying instruments and methods. Indeed, in most instances, both in civil engineering and in industrial engineering, precise locations are already known and marked. It is, therefore, usually possible to use this invention without any preliminary survey or defining of locations. Once the transmitters are in position, the machine can be located using the system anywhere within the range of three transmitters.

In hilly terrain, more than one set of transmitters may be used in reference to different portions of the tract. The output of the transmitters may be coded to identify the specific source of radiation, by intermittent radiation according to a predetermined pattern, for example. A single program which calculates from each of the respective sets of points or a program for calculating from individual sets of fixed points may be provided.

The invention has other applications. For instance, as a one-man survey or position finding system. The transmitters can be set up in the manner described. A portable anglemeasuring detector for the transmitted radiation is carried by the individual on, for example, a light tripod. The individual may carry a backpack computer or simply record data for later computation. The individual simply stops, positions the detector in a stable position for receiving radiation from the transmitters. The angle data are accumulated and processed with the constant data then or at another time. Enormous savings are possible using this system because only one man is required and all of the data intake and computation are handled by a computer. Surveys can be done accurately at one-half the cost using conventional surveying methods. The same principle and substantially the same instrumentation can be used in sporting events, etc., where location is important. For example, one man carrying the instrument described can locate a football when a team gains possession or after a first down and at each subsequent play to determine, for example, if a first down has been accomplished.

The invention may be used to assist individuals or groups to locate themselves in relation to various geographic terrain features. For example, in a military operation the reference points, and point sources of electromagnetic radiation, may be established on tall mountains, buildings or towers out of range of or protected from enemy fire. A patrol would carry an angle-measuring sensor or receiver and microcomputer. Upon reading the fixed points and the angles with the sensor, the patrol can locate itself on a map using the output data as coordinates, or as displayed on a screen, etc. None of this involves any transmission by the patrol and thus avoids the problem of the enemy using the radiation to locate the patrol. If desired, the locational data of the patrol could be transmitted to the command or control headquarters in code, which could be varied infinitely using software encoding, to keep command informed as to the location of the patrol.

The invention may be used in any number of applications. In industrial plants, for example, where placement is important, the machine, whatever its type and function, can be located very precisely in a predetermined area.

The invention may be used over large distances using high power transmitters for ground or air traffic control or monitoring. The locational data from individual vehicles or aircraft may be sent to a central locational processing unit which could display the location and direction and velocity of travel of each vehicle or aircraft. In the case of aircraft, for example, the central location processing unit could transmit to the aircraft involved warnings that they are on a collision path. Obviously, multiple systems at differing altitudes could generate such data and process it in the same way. In addition, by locating transmitters at the base, halfway up and on the top of a mountain, the aircraft can be located vertically. In locations where aircraft traffic is heavy in the vicinity of mountains, a few systems such as just described could be linked together to provide fully automatic warnings of potential air-to-air collisions.

There are other applications in which a location $P_0$ needs to be defined. The system described is especially useful for dynamic or real time position determination and motion tracking. This invention is intended to include these applications. Likewise, by a mere reversal of elements and the addition of necessary communications the sources of radiation with appropriate communication of sensed angles to permit the calculations described above to be completed and the result applied to control the earthmover, transit, aircraft, etc.

Industrial Application

This invention is useful in surveying, grading and in civil engineering generally and in industrial or military operations where it is desirable to locate a machine in reference to a tract or area.

What is claimed is:

1. A method of defining the location of an earth moving or working machine in relation to a tract or area of land, comprising the steps of:

(a) positioning a plurality of point sources of light at each of at least three reference points $P_1$, $P_2$ and $P_3$ in known, defined spacial relationships with respect to each other and to the tract or area of land;

(b) positioning at an unknown point $P_0$ that is in a known, spacially defined relation to the machine an angle-measuring charge coupled device incident light angle measuring detector for detecting the light from the aforesaid point sources;

(c) measuring the angle defined by lines extending through $P_0$ and, respectively, a first set of two of said reference points, $P_1$ and $P_2$ (d) measuring the angle defined by lines extending through $P_0$ and extending respectively through a second set of two of said reference points, $P_1$ and $P_3$ or $P_2$ and $P_3$ the aforesaid first and second sets of reference points being different from each other and being selected such that a geometric figure spacially defined by $P_0$ and the first set overlaps a geometric figure spacially defined by $P_0$ and the second set of reference points; and (e) from the known, spacially defined relation of $P_0$ to the machine and the known, defined spacial relationship of the reference points with respect to each other and to the tract or area of land and data defining said measured angles, calculating the position of $P_0$ and the earth moving machine in relation to said tract or area of land.

2. The method of claim 1 wherein: the reference points are in a known relationship to relevant metes and bounds of a tract of land.

3. The method of claim 1 wherein the reference points do not all lie in the same plane.

4. The method of claim 1 further comprising the step of reporting the result of the aforesaid calculation by way of a video display screen which depicts the location of the machine in relation to the tract.

5. The method of claim 1 further comprising the step of controlling the operation of said machine as a function of the position of $P_0$ in relation to the tract or area of land.

6. A method of defining the location of an earth moving or working machine in relation to a tract or area of land, comprising the steps of:

(a) positioning a plurality of super bright light emitting diodes as point light sources at each of at least three reference points $P_1$, $P_2$ and $P_3$ in known, defined spacial relationship with respect each other and to the tract or area of land;

(b) positioning at least one angle-measuring charge coupled device light detector for light emitted from the aforesaid point light sources at an unknown point $P_0$, said point $P_0$ being in a known spacially defined relation to the machine the location of which is to be defined;

(c) measuring the angle defined by lines extending through $P_0$ and respectively a first set of two of said reference points $P_1$ and $P_2$ (d) measuring the angle defined by lines extending through $P_0$ and a second set of said reference points $P_1$ and $P_3$ or $P_2$ and $P_3$ the aforesaid first and second sets of reference points being different from each other and being selected such that a geometric figure spacially defined by the lines through $P_0$ and the first set of reference points overlaps a geometric figure spacially defined by the lines through $P_0$ and the second set of reference points; and (e) from the known, defined spacial relationship of the reference points with respect to each other and to the tract or area of land and data defining said measured angles, calculating the position of $P_0$ and the earth moving or working machine in relation to said tract or area of land.

7. The method of claim 6 wherein the reference points are in a known relationship to relevant metes and bounds of a tract of land.

8. The method of claim 6 further comprising the step of reporting the results of the aforesaid calculation by way of a video display screen which depicts the location of the machine in relation to the tract or area of land.

9. The method of claim 6 further comprising the step of controlling the operation of said machine as a function of said calculated position of $P_0$ and the earth moving or working machine in relation to said tract or area of land.

10. The method of claim 6 wherein the reference points are not located all in the same plane.

11. A system for locating and defining the position of an earth moving or working machine in relation to a known area or tract of land upon which the earth moving machine is to work, comprising, in combination:

(a) a plurality of super bright point-source light producing and emitting devices located, respectively, at each of at least three reference points $P_1$, $P_2$ and $P_3$ that are in known, defined spacial relationship to each other and to said area or tract of land;

(b) a charge coupled incident light angle measuring sensor system comprising at least one angle measuring CCD sensor for measuring light from said super bright point-source light producing and emitting devices positioned at an unknown location $P_0$ said point $P_0$ being in a known defined spacial relation to said machine, said sensor being so constructed and configured as to measure the angle defined by lines extending through $P_0$ and a first set of two of said reference points, $P_1$ and $P_2$, and substantially simultaneously measuring the angle defined by a second set of two of said reference points, $P_1$ and $P_3$ or $P_2$ and $P_3$ the first and second sets of reference points being different from each other and being selected such that a geometric figure spacially defined by the lines through $P_0$ and the first set of reference points overlaps a geometric figure defined by the lines through $P_0$ and the second set of reference points;

(c) a computer connected to said sensor system for receiving data defining said measured angles and input data defining the relationship of the reference points to each other and to said tract or area and for computing data defining the location of $P_0$ in relation to said tract or area; and (d) means for providing a computed data signal derived from said computed data defining the location of $P_0$ to a display means or to a machine control means.

12. The system of claim 11 further comprising means for controlling the movement or operation of said earth moving or working machine in response to said computed data signal.

13. The system of claim 11 wherein not all point sources are in the same plane.

14. A system for locating and defining the spacial position of a machine, comprising, in combination:

(a) a plurality of super bright point-source light producing and emitting devices located, respectively, at each of at least three reference points $P_1$, $P_2$ and $P_3$ that are in known, defined spacial relationship to each other;

(b) at least one charge coupled incident light angle measuring sensor system comprising at least one angle measuring CCD sensor positioned at a point $P_0$ in a known, spacially defined location relative to said machine for measuring light from said super bright point-source light producing and emitting devices, said sensor being so constructed and configured as to measure the angle defined by lines extending through $P_0$ and a first set of two of said reference points, $P_1$ and $P_2$, and substantially simultaneously measuring the angle defined by a second set of two of said reference points, $P_1$ and $P_3$ or $P_2$ and $P_3$ the first and second sets of reference points being different from each other and being selected such that a geometric figure spacially defined by the lines through $P_0$ and the first set of reference points overlaps a geometric figure defined by the lines through $P_0$ and the second set of reference points;

(c) a computer connected to said sensor system for receiving data defining said measured angles and input data defining the relationship of the reference points to each other and to said machine for computing data defining the location of said machine.

15. A method of defining the spacial location of a machine, comprising the steps of:

(a) positioning a plurality of point sources of light at each of at least three reference points $P_1$, $P_2$ and $P_3$ in known, defined spacial relationships with respect to each other;

(b) positioning at an unknown point $P_0$ that is in a known, spacially defined relation to the machine an angle-measuring charge coupled device incident light angle measuring detector for detecting the light from the aforesaid point sources;

(c) measuring the angle defined by lines extending through $P_0$ and, respectively, a first set of two of said reference points, $P_1$ and $P_2$ (d) measuring the angle defined by lines extending through $P_0$ and extending respectively through a second set of two of said reference points, $P_1$ and $P_3$ or $P_2$ and Ps the aforesaid first and second sets of reference points being different from each other and being selected such that a geometric figure spacially defined by $P_0$ and the first set overlaps a geometric figure spacially defined by $P_0$ and the second set of reference points; and (e) calculating the position of $P_0$ and the spacial position of said machine from the aforesaid known spacial relationships of $P_1$ $P_2$ and $P_3$ with respect to each other, said measured angles and the known relationship between $P_0$ and said machine.

16. A method for defining the spacial location of a machine, comprising the steps of:

(a) positioning a plurality of point sources of light at each of at least three reference points $P_1$ $P_2$ and $P_3$ in known, defined spacial relationships with respect to each other;

(b) positioning at point $P_0$ an angle-measuring incident light detector which is capable of receiving and differentiating simultaneously between a plurality of point sources of light emitted respectively from the point sources of light located respectively at points $P_1$ $P_2$ and $P_3$; points $P_0$, $P_1$ and $P_2$ being positioned so as to lie on the circumference of a circle 1 defined by said points $P_0$, $P_1$ and $P_2$ the last said points; points $P_0$, $P_1$ and $P_3$ being positioned so as to lie on the circumference of a circle 2 defined by said points $P_0$, $P_1$ and $P_3$ and points $P_0$, $P_2$ and Ps being positioned so as to lie on the circumference of a circle 3 defined by said points $P_0$, $P_2$ and $P_3$ point $P_0$ being in a known, defined spacial relationship with respect to said machine;

(c) measuring at least two of angle A, angle B and angle C; wherein Angle A is defined by lines passing, respectively, through $P_0$–$P_1$ and $P_0$–$P_2$; Angle B is defined by lines passing, respectively, through $P_0$–$P_1$ and $P_0$–$P_3$; and Angle C is defined by lines passing, respectively, through $P_0$–$P_2$ and $P_0$–$P_3$; $P_0$ being positioned in a known, spacially defined relation to said machine; said angles being less than 180° angles and not being 90° angles;

(d) measuring at least two of said angles A, B and C, and mathematically defining at least two of circles 1, 2 and 3, wherein:

(i) circle 1 has a radius $$r_1 = \frac{d_1}{2 \sin A}$$

where $d_1$ is the distance $P_1$ to $P_2$, the center of the circle lying on a line which is a perpendicular bisector of $P_1P_2$ a distance $$d_{1'} = \frac{d_1}{2 \tan A}$$

from the center of a line between $P_1$ and $P_2$;

(ii) circle 2 has a radius $$r_2 = \frac{d_2}{2 \sin B}$$

where $d_2$ is the distance $P_2$ to $P_3$. The center of the circle lying on a line which is a perpendicular bisector of $P_2P_3$ a distance $$d_{2'} = \frac{d_2}{2 \tan B}$$

from the center of a line between $P_2$ and $P_3$;

(iii) circle 3 has a radius $$r_3 = \frac{d_3}{2 \sin C}$$

where $d_3$ is the distance $P_1$ to $P_3$, the center of the circle lying on a line which is a perpendicular bisector of $P_1P_3$ a distance $$d_{3'} = \frac{d_3}{2 \tan C}$$

from the center of a line between $P_1$ and $P_3$;

(e) calculating the common intersecting points on the circumference of at least two of said circles 1, 2 and 3, defined by at least two of angles A, B, and C at $P_0$ to thereby define the spacial position of $P_0$ relative to the known spacial positions of $P_1$, $P_2$ and $P_3$ with respect to each other thereby defining the spacial relationship of said machine relative to $P_1$, $P_2$ and $P_3$ 17. The method of claim 16 wherein the machine is an earth working machine and wherein points $P_1$, $P_2$ and $P_3$ are in a known, defined spacial relationships with respect to a tract of land, and wherein the location of the machine is defined in relation to said tract of land.

18. The method of claim 16 wherein the angle-measuring incident light detector which is capable of receiving and differentiating simultaneously between a plurality of point sources of light is a charge coupled detector.

* * * * *